US011534722B2

United States Patent
Kodama et al.

(10) Patent No.: US 11,534,722 B2
(45) Date of Patent: Dec. 27, 2022

(54) GAS SEPARATION APPARATUS AND GAS SEPARATION METHOD

(71) Applicants: SUMITOMO CHEMICAL COMPANY, LIMITED, Tokyo (JP); RENAISSANCE ENERGY RESEARCH CORPORATION, Kyoto (JP)

(72) Inventors: Nobutaka Kodama, Osaka (JP); Takehiro Nakasuji, Niihama (JP); Osamu Okada, Kyoto (JP); Masaaki Teramoto, Kyoto (JP); Nobuaki Hanai, Kyoto (JP)

(73) Assignees: SUMITOMO CHEMICAL COMPANY, LIMITED, Tokyo (JP); RENAISSANCE ENERGY RESEARCH CORPORATION, Kyoto (JP)

( * ) Notice: Subject to any disclaimer, the term of this patent is extended or adjusted under 35 U.S.C. 154(b) by 505 days.

(21) Appl. No.: 16/607,310

(22) PCT Filed: Oct. 25, 2018

(86) PCT No.: PCT/JP2018/039595
§ 371 (c)(1),
(2) Date: Oct. 22, 2019

(87) PCT Pub. No.: WO2019/093134
PCT Pub. Date: May 16, 2019

(65) Prior Publication Data
US 2020/0376438 A1    Dec. 3, 2020

(30) Foreign Application Priority Data
Nov. 7, 2017   (JP) .............................. JP2017-214884

(51) Int. Cl.
*B01D 53/22*   (2006.01)
*B01D 63/10*   (2006.01)
(Continued)

(52) U.S. Cl.
CPC .......... *B01D 63/10* (2013.01); *B01D 53/226* (2013.01); *B01D 53/227* (2013.01); *B01D 65/00* (2013.01);
(Continued)

(58) Field of Classification Search
CPC .. B01D 63/10; B01D 53/226; B01D 2313/22; B01D 2325/36; B01D 69/02; B01D 65/00; B01D 53/227
See application file for complete search history.

(56) References Cited

U.S. PATENT DOCUMENTS 4,787,919 A    11/1988  Campbell et al.
4,904,597 A *   2/1990  Inoue .................... C12M 23/14
                                                        435/243

(Continued)

FOREIGN PATENT DOCUMENTS

CN         1041885 A       5/1990
EP       3 231 501 A1     10/2017
(Continued)

OTHER PUBLICATIONS

Japanese Notice of Grounds of Rejection issued in corresponding Japanese Patent Application No. 2017-214884, dated Jul. 16, 2019, with English translation.
(Continued)

*Primary Examiner* — Anthony R Shumate
(74) *Attorney, Agent, or Firm* — McDermott Will & Emery LLP

(57) ABSTRACT

A gas separation apparatus includes a separation membrane module including at least one gas separation membrane
(Continued)

element in a housing, a casing for blocking external air, and a heat source unit for adjusting a temperature of a heat medium with which the casing is filled. The casing holds greater than or equal to two separation membrane modules.

11 Claims, 4 Drawing Sheets

(51) Int. Cl.
  *B01D 65/00* (2006.01)
  *B01D 69/02* (2006.01)

(52) U.S. Cl.
  CPC .......... *B01D 69/02* (2013.01); *B01D 2313/22* (2013.01); *B01D 2325/36* (2013.01)

(56) References Cited

U.S. PATENT DOCUMENTS

| | | | |
|---|---|---|---|
| 5,011,698 A * | 4/1991 | Antoon, Jr. | A61F 13/00 428/36.5 |
| 5,429,662 A | 7/1995 | Fillet | |
| 5,720,411 A * | 2/1998 | Darby | B01D 65/00 220/582 |
| 2007/0173709 A1* | 7/2007 | Petisce | A61B 5/14532 204/403.05 |
| 2011/0223650 A1* | 9/2011 | Saunders | B01D 53/226 435/283.1 |
| 2012/0118011 A1* | 5/2012 | Terrien | C01B 3/48 62/619 |
| 2014/0065054 A1* | 3/2014 | Noyes | C25B 1/04 422/120 |
| 2014/0352540 A1 | 12/2014 | Okada et al. | |
| 2015/0182917 A1* | 7/2015 | Hosoya | B01D 63/106 422/212 |
| 2017/0182462 A1* | 6/2017 | Torichigai | B31C 3/00 |
| 2018/0185784 A1 | 7/2018 | Kodama et al. | |
| 2018/0370816 A1* | 12/2018 | Bower | B01D 61/366 |
| 2019/0111382 A1 | 4/2019 | Liang et al. | |

FOREIGN PATENT DOCUMENTS

| | | |
|---|---|---|
| JP | 02-102710 A | 4/1990 |
| JP | 06-182137 A | 7/1994 |
| JP | 07-80252 A | 3/1995 |
| JP | 10-174835 A | 6/1998 |
| JP | 2002-282640 A | 10/2002 |
| JP | 2009-039654 A | 2/2009 |
| JP | 2015-208714 A | 11/2015 |
| JP | 2017-018955 A | 1/2017 |
| TW | 201707769 A | 3/2017 |
| WO | 2016/204279 A1 | 12/2016 |
| WO | 2017/050638 A1 | 3/2017 |
| WO | 2017/146159 A1 | 8/2017 |
| WO | 2017/175656 A1 | 10/2017 |

OTHER PUBLICATIONS

International Search Report issued in corresponding International Patent Application No. PCT/JP2018/039595, dated Jan. 15, 2019, with English translation.
Extended European Search Report issued in corresponding European Patent Application No. 18875753.8-1104, dated Dec. 23, 2020.
Chinese Office Action issued in corresponding Chinese Patent Application No. 201880033164.0, dated Jun. 25, 2021, with English translation.
Korean Grounds for Rejection issued in corresponding Korean Patent Application No. 10-2019-7033991, dated Jan. 20, 2021, with English translation.

* cited by examiner

GAS SEPARATION APPARATUS AND GAS SEPARATION METHOD

CROSS REFERENCE TO RELATED APPLICATIONS

This application is the U.S. National Phase under 35 U.S.C. § 371 of International Application No. PCT/JP2018/039595 filed on Oct. 25, 2018, which claims the benefit of Japanese Application No. 2017-214884, filed on Nov. 7, 2017.

TECHNICAL FIELD

The present invention relates to a gas separation apparatus and a gas separation method.

BACKGROUND ART

In order to separate a specific component from a source fluid such as a liquid or a gas, it has been known to use a separation membrane module in which a separation filter that causes the specific component to selectively permeate therethrough is mounted in a housing (for example, Japanese Patent Laying-Open No. 2009-39654 (PTL 1), Japanese Patent Laying-Open No. 2015-208714 (PTL 2), Japanese Patent Laying-Open No. 2002-282640 (PTL 3), and Japanese Patent Laying-Open No. 7-80252 (PTL 4). In the separation membrane module, the separation filter may be heated or cooled during operation, at the start of operation, or at the stop of operation.

For example, PTLs 1 and 2 describe separation membrane modules in which a plurality of separation membrane elements including heating means around the separation membrane elements are disposed in a housing. PTL 3 describes a gas separation module in which a gas separation filter is mounted in a housing, and describes that a heating source is provided on the outer periphery part of the housing or in the housing to heat the gas separation filter. PTL 4 describes a membrane module including a cooling jacket for cooling a liquid in contact with a pervaporation membrane.

CITATION LIST

Patent Literature

PTL 1: Japanese Patent Laying-Open No. 2009-39654
PTL 2: Japanese Patent Laying-Open No. 2015-208714
PTL 3: Japanese Patent Laying-Open No. 2002-282640
PTL 4: Japanese Patent Laying-Open No. 07-80252

SUMMARY OF INVENTION

Technical Problem

The present invention provides a gas separation apparatus and a gas separation method capable of reducing an energy amount required in order to maintain the temperature of a gas that flows in a separation membrane module at a predetermined temperature.

Solution to Problem

[1] A gas separation apparatus comprising:
a separation membrane module including at least one gas separation membrane element in a housing;
a casing for blocking external air; and
a heat source unit for adjusting a temperature of a heat medium with which the casing is filled,
wherein the casing holds greater than or equal to two separation membrane modules.

[2] The gas separation apparatus according to [1], wherein the heat source unit is provided at least inside or outside the casing.

[3] The gas separation apparatus according to [1] or [2], wherein layers constituting the casing have a thermal resistance value of greater than or equal to 0.1 $m^2 \cdot K/W$.

[4] The gas separation apparatus according to any one of [1] to [3], wherein a material forming at least one layer of the layers constituting the casing has a thermal conductivity of 1 $W/(m \cdot K)$ or less.

[5] The gas separation apparatus according to any one of [1] to [4], wherein the separation membrane module includes greater than or equal to two gas separation membrane elements in a housing.

[6] The gas separation apparatus according to any one of [1] to [5], further including:
a source gas flow pipe for feeding a source gas to the separation membrane module; and
an exhaust gas flow pipe for discharging an exhaust gas from the separation membrane module.

[7] The gas separation apparatus according to [6], wherein:
the source gas flow pipe includes a branched part for distributing and feeding the source gas to each of the separation membrane modules;
the exhaust gas flow pipe includes a collecting part for collecting and discharging the exhaust gases discharged by the separation membrane modules; and
at least one of the branched part and the collecting part is provided in the casing.

[8] The gas separation apparatus according to any one of [1] to [7], wherein the source gas fed to the gas separation membrane element contains at least steam.

[9] The gas separation apparatus according to any one of [1] to [8], wherein the gas separation membrane element includes a gas separation membrane including a hydrophilic resin composition layer.

[10] The gas separation apparatus according to [9], wherein the hydrophilic resin composition layer contains a hydrophilic resin and a substance that reversibly reacts with an acidic gas.

[11] The gas separation apparatus according to any one of [1] to [10], wherein the gas separation membrane element is a spiral-type gas separation membrane element.

[12] A gas separation method using the gas separation apparatus according to any one of [1] to [11], the method including the steps of:
adjusting a temperature of the heat medium so that the temperature is maintained at a predetermined temperature using the heat source unit; and
feeding a source gas to the separation membrane module to perform a gas separation treatment.

Advantageous Effect of Invention

The gas separation apparatus and the gas separation method according to the present invention can suppress the heat release amount of the gas that flows in the separation membrane module to reduce the energy amount required in order to maintain the temperature of the gas.

DESCRIPTION OF EMBODIMENTS

<Gas Separation Apparatus>

Figure 1:
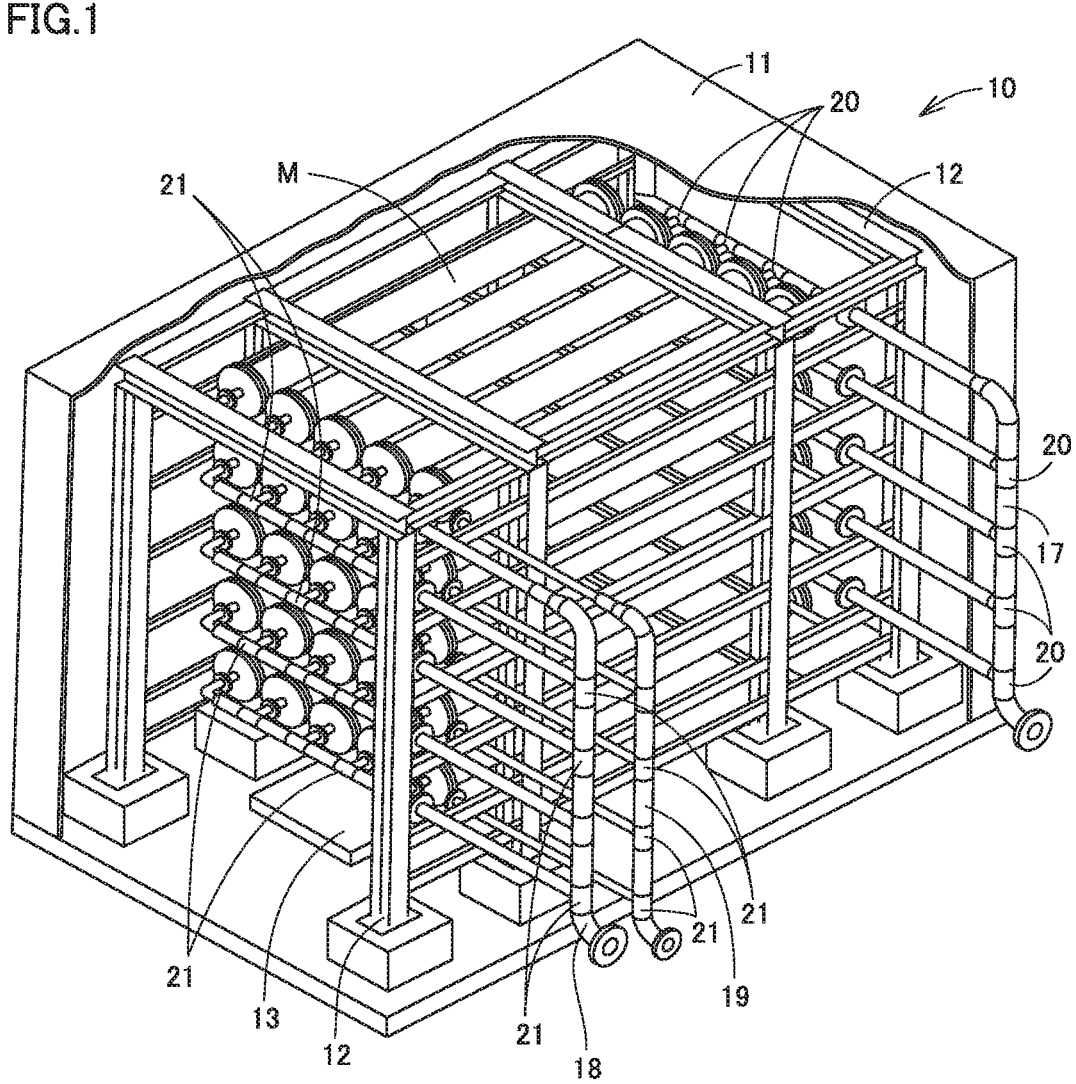
FIG. 1 is a schematic perspective view showing a gas separation apparatus according to the present invention as an example, in which a partially cutout portion is provided.

FIG. 1 is a schematic perspective view showing a gas separation apparatus 10 according to the present embodiment, in which a partially cutout portion is provided. Gas separation apparatus 10 of the present embodiment can feed a source gas to a separation membrane module M including a gas separation membrane element, and separate and produce a permeate gas permeating through the gas separation membrane element causing a specific gas in the source gas to permeate therethrough, and a retentate gas that has not permeated through the gas separation membrane element in the source gas.

Gas separation apparatus 10 of the present embodiment includes a separation membrane module including at least one gas separation membrane element in a housing, a casing for blocking external air, and a heat source unit for adjusting a temperature of a heat medium with which the casing is filled, wherein the casing holds greater than or equal to two separation membrane modules.

Gas separation apparatus 10 can include a pipe for causing each of the source gas, the permeate gas that has permeated through the gas separation membrane element in separation membrane module M, and the retentate gas that has not permeated through the gas separation membrane element to flow in separation membrane module M. Specifically, gas separation apparatus 10 can include, as a pipe connected to separation membrane module M in a casing 11, a source gas flow pipe 17 for feeding the source gas to the gas separation membrane element provided in separation membrane module M, a permeate gas flow pipe (exhaust gas flow pipe) 18 for discharging the permeate gas that has permeated through a gas separation membrane provided in the gas separation membrane element, and a retentate gas flow pipe (exhaust gas flow pipe) 19 for discharging the retentate gas that has not permeated through the gas separation membrane provided in the gas separation membrane element. Hereinafter, permeate gas flow pipe 18 and retentate gas flow pipe 19 may be collectively referred to as an exhaust gas flow pipe.

Hereinafter, each of parts of gas separation apparatus 10 will be described.

[Gas Separation Membrane Element]

Known gas separation membrane elements can be used as the gas separation membrane element provided in separation membrane module M of gas separation apparatus 10. Examples thereof include spiral-type, hollow fiber-type, tube-type, plate and frame-type, and monolith-type gas separation membrane elements. The gas separation membrane element is not particularly limited as long as it includes, for example, a separation membrane that causes a specific gas to permeate therethrough and to be separated from a source gas containing a plurality of types of gases. Examples of the specific gas include inorganic gases (nitrogen, oxygen and the like), combustible gases (hydrogen, methane and the like), steam, and acidic gases exhibiting acidity (carbon dioxide, hydrogen sulfide, carbonyl sulfide, sulfur oxide (SOx), nitrogen oxide (NOx), and hydrogen halides such as hydrogen chloride).

Figure 2:
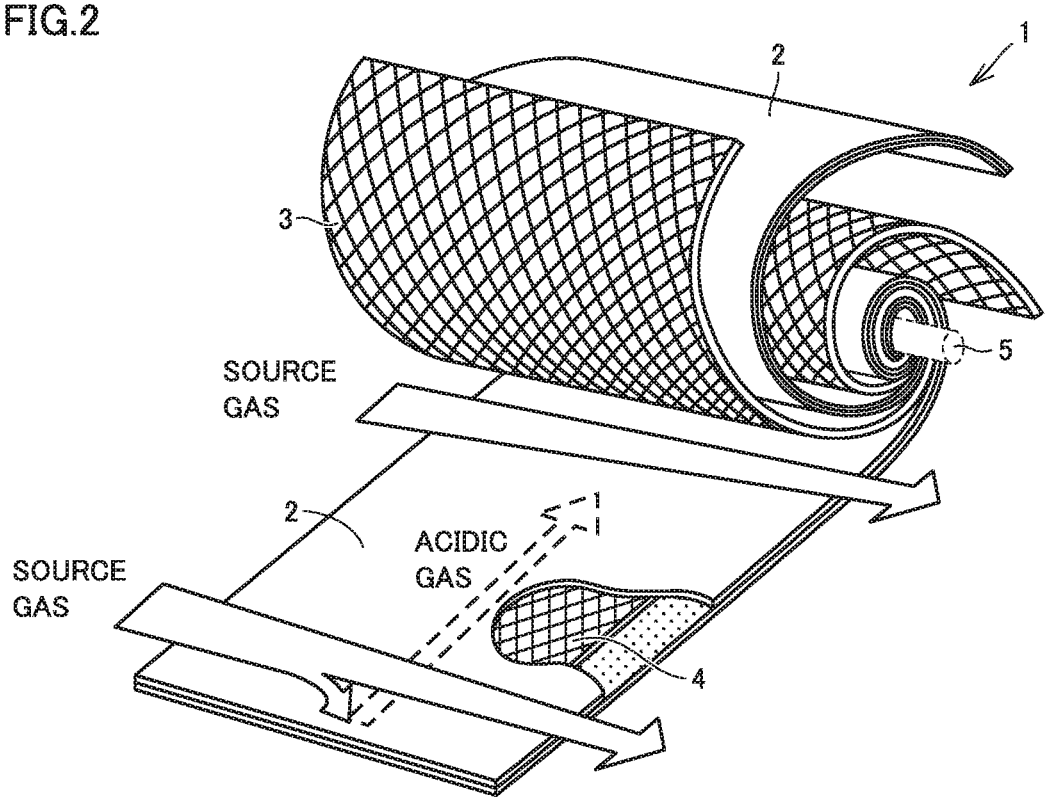
FIG. 2 is a schematic perspective view showing a developed gas separation membrane element according to the present invention as an example, in which a partially cutout portion is provided.

A case of using the spiral-type gas separation membrane element as the gas separation membrane element will be described as an example. FIG. 2 is a schematic perspective view showing a developed spiral-type gas separation membrane element, in which a partially cutout portion is provided. The spiral-type gas separation membrane element may include a feed-side flow channel member 3 through which a source gas containing a specific gas flows, a gas separation membrane 2 that selectively separates the specific gas contained in the source gas flowing in feed-side flow channel member 3 to cause the specific gas to permeate therethrough, a permeate-side flow channel member 4 through which the permeate gas containing the specific gas that has permeated through gas separation membrane 2 flows, a sealing part for preventing the mixing of the source gas with the permeate gas, and a central tube 5 for collecting the permeate gas flowing in permeate-side flow channel member 4. The spiral-type gas separation membrane element may include a wound body which includes central tube 5 and a laminated body wound around central tube 5. In the laminated body, at least one feed-side flow channel member 3, at least one gas separation membrane 2, and at least one permeate-side flow channel member 4 are laminated. The wound body may have any shape such as a cylindrical shape or a rectangular cylindrical shape.

Gas separation membrane element 1 may further include a fixing member (not shown) such as an outer peripheral tape or an anti-telescope device in order to prevent the wound body from rewinding or the collapse of winding. In order to secure strength against a load due to internal pressure and external pressure on gas separation membrane element 1, an outer wrap (reinforcing layer) may be provided on the outermost periphery of the wound body.

Feed-side flow channel member 3 and permeate-side flow channel member 4 preferably have a function of promoting the turbulent flows (surface renewal of the membrane surface) of the source and permeate gas that has permeated through gas separation membrane 2 to increase the membrane permeation rate of the permeate gas in the source gas, and a function of reducing the pressure losses of the source gas to be fed and permeate gas that has permeated through gas separation membrane 2 as much as possible. Feed-side flow channel member 3 and permeate-side flow channel member 4 preferably have a function as a spacer for forming a flow channel for the source gas and the permeate gas, and a function of generating turbulent flow in the source gas and the permeate gas, whereby those having a network shape (net shape, mesh shape, and the like) are suitably used. Depending on the network shape, the flow channel for the gas changes. Therefore, the shape of the unit cell of the network is preferably selected according to the purpose, for example, from shapes such as a square, a rectangle, a rhombus, and a parallelogram. Materials of feed-side channel member 3 and permeate-side channel member 4 are not particularly limited. The materials preferably have heat resistance capable of enduring temperature conditions where gas separation apparatus 10 is used.

As gas separation membrane element 1, an acidic gas separation membrane element for separating an acidic gas from a source gas containing the acidic gas can be used. Examples of gas separation membrane 2 used for gas separation membrane element 1 include a separation membrane that utilizes a molecular sieving mechanism for separating specific molecules by utilizing differences between sizes and shapes of gas molecules contained in the source gas, a solution-diffusion mechanism that separates a specific gas utilizing a difference between solubilities of gas components contained in the source gas in a membrane material and a difference between diffusion coefficients of gas components contained in the source gas in the membrane, and a facilitated transport mechanism of adding a carrier that reversibly reacts with a specific gas component contained in the source gas into a membrane material to promote the permeation of the specific gas. In particular, when the specific gas is separated utilizing the facilitated transport mechanism, gas separation membrane element 1 preferably includes a gas separation membrane containing a hydrophilic resin as described later.

When gas separation membrane element 1 is an acidic gas separation membrane element for separating an acidic gas from a source gas containing at least the acidic gas, gas separation membrane 2 can have gas selective permeability that is likely to cause the acidic gas to permeate therethrough and is less likely to cause other gases to permeate therethrough in order to cause the acidic gas contained in the source gas flowing in feed-side flow channel member 3 to selectively permeate therethrough. When gas separation membrane 2 is a separation membrane containing an acidic gas carrier that reacts reversibly with an acidic gas, the facilitated transport mechanism forming a reaction product between the acidic gas contained in the source gas and the acidic gas carrier contained in the membrane material to promote the permeation of the acidic gas in addition to the above-described solution-diffusion mechanism can realize the high selective permeability of the acidic gas.

The following reaction formula (1) represents a reaction of $CO_2$ and a $CO_2$ carrier when the acidic gas is $CO_2$ and cesium carbonate ($Cs_2CO_3$) is used as the acidic gas carrier ($CO_2$ carrier). The symbol "↔" in the reaction formula (1) indicates that this reaction is a reversible reaction.

$$CO_2 + Cs_2CO_3 + H_2O \leftrightarrow 2CsHCO_3 \quad (1)$$

As shown by the above reaction formula (1), water is necessary for the reversible reaction of $CO_2$ and the $CO_2$ carrier. That is, in gas separation membrane 2 in which the acidic gas is $CO_2$, as shown by the above reaction formula (1), water in the membrane material causes the amount of permeation of the acidic gas to change. As the amount of the water in the membrane material is more, the amount of permeation of the acidic gas is more.

In gas separation membrane 2 as the acidic gas separation membrane, as shown by the above reaction formula (1), water is required for a reversible reaction of the acidic gas and the acidic gas carrier. Therefore, gas separation membrane 2 preferably includes a gel-like hydrophilic resin composition layer containing a hydrophilic resin having a hydrophilic group such as a hydroxyl group or an ion exchange group. It is preferable that the polymer forming the hydrophilic resin preferably has, for example, a structural unit derived from an alkyl acrylate, an alkyl methacrylate, a vinyl ester of a fatty acid, or a derivative thereof.

It is more preferable that the hydrophilic resin contains a crosslinking-type hydrophilic resin in which molecular chains of the hydrophilic resin are crosslinked to form a network structure, exhibiting high water-holding properties. Since a large pressure difference is applied as a driving force for the permeation of an acidic gas through gas separation membrane 2, it is preferable to use a hydrophilic resin containing the crosslinking-type hydrophilic resin also from the viewpoint of pressure resistance strength required for gas separation membrane 2. The crosslinking-type hydrophilic resin may be prepared by causing a polymer exhibiting hydrophilicity to react with a crosslinking agent, or may also be prepared by copolymerizing a monomer that serves as the source of the polymer exhibiting hydrophilicity with a crosslinkable monomer. The crosslinking agent or the crosslinkable monomer is not particularly limited, and a conventionally known crosslinking agent or crosslinkable monomer can be used. As the crosslinking agent and the crosslinking method, a conventionally known method can be adopted.

The acidic gas carrier is a substance that reversibly reacts with an acidic gas in a source gas. The acidic gas carrier is contained in gas separation membrane 2, whereby the permeation of the acidic gas can be promoted in gas separation membrane 2 in which the source gas containing the acidic gas is fed from feed-side flow channel member 3. The acidic gas carrier is present in the hydrophilic resin composition layer containing the hydrophilic resin in gas separation membrane 2, and reversibly reacts with the acidic gas dissolved in water present in the hydrophilic resin composition layer, whereby the acidic gas carrier causes the acidic gas to selectively permeate therethrough. The acidic gas carrier is preferably at least one carbonate, bicarbonate or hydroxide of an alkali metal selected from the group consisting of Na, K, Rb and Cs, and one or two or more thereof can be used.

The hydrophilic resin composition layer of gas separation membrane 2 may also contain, for example, a hydration reaction catalyst for the acidic gas and a surfactant and the like as an additive in addition to the hydrophilic resin and the acidic gas carrier.

A sealing part is provided to prevent the mixing of the source gas with the permeate gas. For example, a sealing material penetrates into permeate-side flow channel member 4 and gas separation membrane 2, and is cured, whereby the sealing part can be formed. The sealing part can be generally provided at end parts located at both ends in a direction parallel to the axis of central tube 5 of the wound body, and at the end part in which a distance between central tube 5 and the end part is long among end parts located at both ends in a direction orthogonal to the axis of central tube 5 so as to have a so-called envelope shape. A material generally used as an adhesive agent can be used for the sealing part. For example, an epoxy resin and the like can be used.

Figure 3:
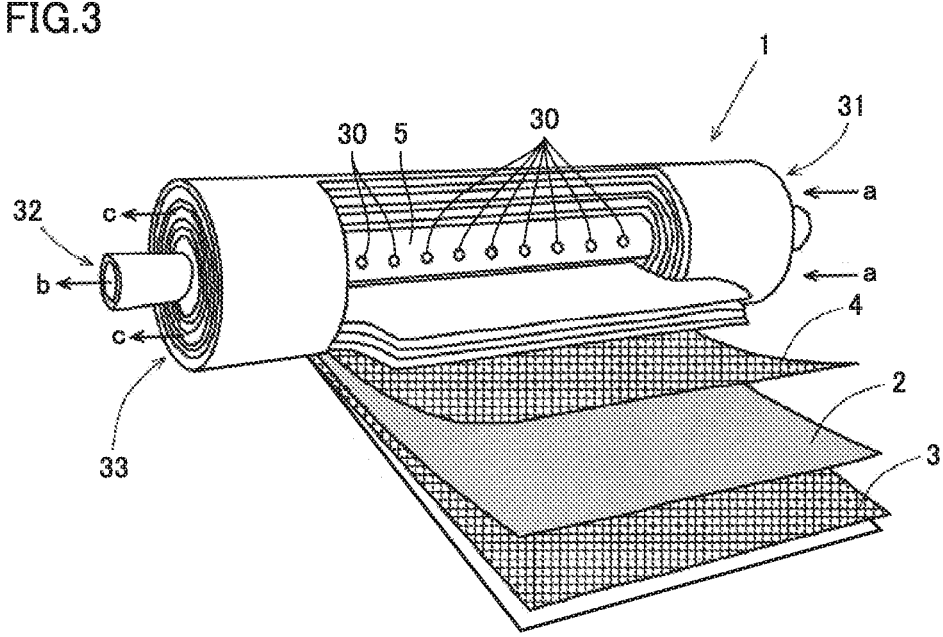
FIG. 3 is a schematic perspective view showing a gas separation membrane element according to the present invention as an example, in which a partially developed portion is provided.

Central tube 5 is a conduit for collecting the permeate gas that has permeated through gas separation membrane 2 and discharging the same from gas separation membrane element 1. Central tube 5 is preferably made of a material that has heat resistance capable of enduring temperature conditions in which gas separation apparatus 10 is used, and mechanical strength capable of enduring the winding of the laminated body. As shown in FIG. 3, central tube 5 has a plurality of holes 30 in the outer peripheral surface of central tube 5. Holes 30 communicate between the flow channel space for the permeate gas formed by permeate-side flow channel member 4 and an inner hollow space of central tube 5.

[Gas Separation Membrane Module]

Separation membrane module M includes including at least one gas separation membrane element 1 in a housing. FIG. 3 is a schematic perspective view showing gas separation membrane element 1, in which a partially developed portion is provided. FIGS. 4A to 4D is a schematic view of separation membrane module M in which gas separation membrane element 1 is disposed in housing 15.

Housing 15 can form a space for sealing the source gas flowing in separation membrane module M. Housing 15 may include, for example, a cylindrical member made of stainless steel and the like, and a blocking member for blocking both the axial ends of the cylindrical member (FIGS. 4A to 4D). The blocking member is not particularly limited as long as it can block both the axial ends of the cylindrical member. The blocking member may be, for example, a flange lid larger than the diameter of a cylindrical member including a sealing member such as an O-ring or a gasket (see both ends of separation membrane module M of FIGS. 4A to 4D). Housing 15 may have any shape such as a cylindrical shape or a rectangular cylindrical shape. However, gas separation membrane element 1 preferably has a cylindrical shape since gas separation membrane element 1 generally has a cylindrical shape.

Housing 15 can include a source gas inlet (portion communicating with a feed-side end part 31 shown in FIG. 3), a permeate gas outlet that has permeated through gas separation membrane 2 provided in gas separation membrane element 1 (portion communicating with a discharge port 32 shown in FIG. 3), and an outlet for retentate gas that has not permeate through gas separation membrane 2 provided in gas separation membrane element 1 (portion communicating with a discharge-side end part 33 shown in FIG. 3). A partition can be provided in housing 15 to prevent the mixing of the source gas fed to feed-side end part 31 with the retentate gas that has not permeate through gas separation membrane 2 provided in gas separation membrane element 1.

Figure 4A:
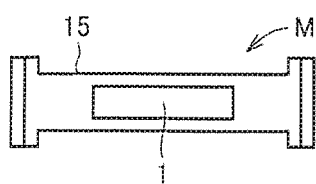
FIGS. 4A to 4D are schematic views showing the arrangement of gas separation membrane elements in a housing as an example.
Figure 4B:
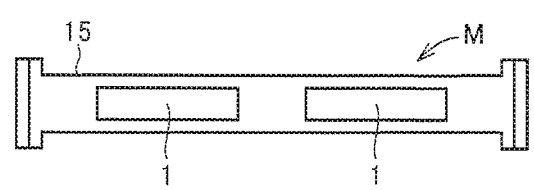
Figure 4C:
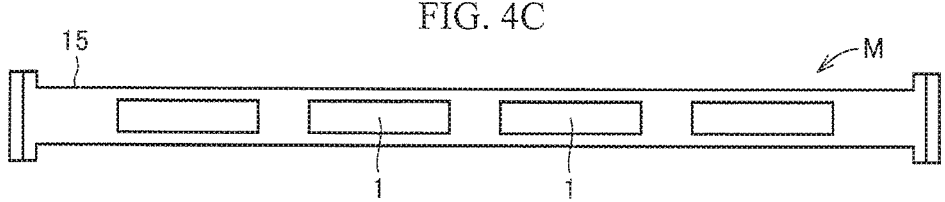
Figure 4D:
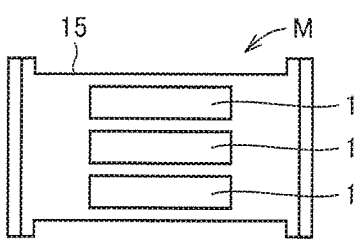

Separation membrane module M may include at least one gas separation membrane element 1 in a housing, and preferably includes greater than or equal to two gas separation membrane elements 1 in a housing. The upper limit of the number of gas separation membrane elements 1 provided in housing 15 is not particularly limited, and it is preferable that the upper limit is generally 100 or less. FIG. 4A shows an example in which one gas separation membrane element 1 is provided in housing 15. FIG. 4B shows an example in which two gas separation membrane elements 1 are provided in housing 15. FIG. 4C shows an example in which four gas separation membrane elements 1 are provided in housing 15. FIG. 4D shows an example in which three gas separation membrane elements 1 are provided in housing 15. The arrangement and number of gas separation membrane elements 1 disposed in housing 15 can be selected depending on, for example, the recovery ratio of the acidic gas contained in the permeate gas that permeates through gas separation membrane element 1 when gas separation membrane element 1 is an acidic gas separation membrane element. Here, the recovery ratio of the acidic gas is a value calculated by the following formula:

recovery ratio of acidic gas=(flow rate of acidic gas in permeate gas/flow rate of acidic gas in source gas)×100.

When greater than or equal to two gas separation membrane elements 1 are disposed in housing 15, gas separation membrane elements 1 may be disposed in series in housing 15 (FIGS. 4B, 4C); gas separation membrane elements 1 may be disposed in parallel in housing 15 (FIG. 4D); or these may be combined.

When greater than or equal to two gas separation membrane elements 1 are disposed in housing 15, the source gases fed to respective gas separation membrane elements 1 may be fed in parallel or in series. Here, feeding source gases in parallel means that at least the source gases are distributed and introduced into a plurality of gas separation membrane elements. Feeding source gases in series means that at least a permeate gas and/or a retentate gas discharged from upstream gas separation membrane element 1 are/is introduced into downstream gas separation membrane element 1.

For example, as shown in FIG. 4B, when two gas separation membrane elements 1 are apparently disposed in series in housing 15, and the source gases are fed in parallel to two gas separation membrane elements 1, the source gases are fed in parallel to the two gas separation membrane elements 1 from an inlet provided in housing 15. The permeate gas that has permeated through gas separation membrane 2 provided in each gas separation membrane element 1 may be discharged from each of the two permeate gas outlet ports provided in housing 15, and the retentate gas that has not permeated through gas separation membrane 2 provided in each gas separation membrane element 1 may be discharged from the retentate gas outlet port provided in housing 15. In this case, the inlet port of the source gas and the outlet port of the retentate gas provided in housing 15 may each be provided for every gas separation membrane element 1, or may also be shared by two gas separation membrane elements 1. Alternatively, it is also possible that the source gas inlet port is provided as a single, and the retentate gas outlet port is provided for every gas separation membrane element 1 to provide two outlet ports. Conversely, it is also possible that the source gas inlet port is provided for every gas separation membrane element 1 to provide two inlet ports, and the retentate gas outlet port is provided as a single.

[Casing]

As shown in FIG. 1, gas separation apparatus 10 includes a casing 11 for blocking external air. Casing 11 can hold a plurality of separation membrane modules M. In gas separation apparatus 10 of the present embodiment, plurality of separation membrane modules M held in casing 11 are disposed in an integrated manner. Therefore, for example, when it is necessary to subject a large flow rate of source gas to a gas separation treatment, the treatment amount of the gas separation treatment can be increased by a simple method of increasing the number of separation membrane modules M to be integrated. It is conceivable to increase the number of separation membrane elements disposed in separation membrane module M as a method of increasing the treatment amount of the gas separation treatment, but the volume of housing 15 is usually restricted, so that this method makes it difficult to increase the treatment amount of the gas separation treatment.

The thickness of a layer constituting casing 11 (total thickness in the case of a multilayer structure) is preferably 1.0 m or less, more preferably 0.6 m or less, and still more preferably 0.3 m or less. The shape of casing 11 and the material forming the layer constituting casing 11 are not particularly limited as long as they can block external air. The shape of casing 11 may be appropriately selected depending on the size of separation membrane module M and the number of separation membrane modules M to be integrated. The shape of casing 11 may be any shape such as a rectangular parallelepiped shape, a cubic shape, or a cylindrical shape. From the viewpoint of improving an integration efficiency, a rectangular parallelepiped shape or a cubic shape is preferable.

As the material forming the layer constituting casing 11, a material capable of blocking the heat medium in casing 11 from the external air can be used. For example, resins, tempered glasses, ceramics, metals, and woods and the like can be used. The layer constituting casing 11 preferably has a thermal resistance value of greater than or equal to 0.1 $m^2 \cdot K/W$, more preferably greater than or equal to 1 $m^2 \cdot K/W$, and usually less than or equal to 1,000 $m^2 \cdot K/W$. When casing 11 has a single-layer structure, the thermal resistance value of the layer constituting the casing 11 is a value (thickness of layer/thermal conductivity of material forming layer) obtained by dividing the thickness [m] of the layer constituting casing 11 by the thermal conductivity [W/(m·K)] of the material forming the layer constituting casing 11. When casing 11 has a multilayer structure including a plurality of layers, a thermal resistance value is calculated for each layer, and the sum of the calculated thermal resistance values of the layers is taken as the thermal resistance value of the material forming casing 11. The thermal conductivity is a value measured in accordance with JIS A 1412-2. The average temperature of the material forming casing 11 when the thermal conductivity is measured is 23±1° C.

In order to prevent the heat of the heat medium with which casing 11 is filled from being dissipated from the outer surface of casing 11 to improve the heat retention efficiency of the heat medium in casing 11, a heat insulating material is preferably used. The material that can be used as the heat insulating material preferably has a thermal conductivity of 1 W/(m·K) or less, more preferably 0.1 W/(m·K) or less, and usually a value exceeding 0.001 W/(m·k). Specific examples of the heat insulating material include fiber integrated products made of natural fibers, synthetic fibers, mineral fibers (rock wool), and glass fibers and the like, foams, non-woven fabrics, and inorganic porous heat insulating materials.

The layer constituting casing 11 may be formed of the above-described heat insulating material, and a layer formed of a material other than the above-described heat insulating material may be covered with the above-described heat insulating material. When casing 11 has a multilayer structure, casing 11 may be formed by using at least one of a laminated body obtained by laminating a plurality of layers formed of a material other than the above-described heat insulating material, a laminated body obtained by laminating a plurality of layers formed of the above-described heat insulating material, and a laminated body obtained by combining and laminating a layer formed of a material other than the above-described heat insulating material with a layer formed of the above-described heat insulating material. Preferably, a laminated body obtained by using at least one layer formed of a heat insulating material. The laminated body used to form casing 11 may contain a layer for preventing water from entering the layer constituting casing 11 during rainfall or snowfall, or a layer for ensuring the shape and mechanical strength of casing 11. The material for maintaining the shape of casing 11 may contain a columnar or plate-shaped structure.

As described later, a heat source unit 13 for adjusting the temperature of the heat medium in casing 11 may be installed on the floor surface, side wall surface, and ceiling surface and the like of casing 11. In this case, it is preferable that installation surfaces such as the floor surface, side wall surface, and ceiling surface on which heat source unit 13 is installed in casing 11 are formed of laminated bodies formed of different materials. Specifically, preferred is a laminated body including a metal layer having a large thermal conductivity provided on a side being in contact with heat source unit 13, and at least one layer formed of a material provided on a side opposite to the side being in contact with heat source unit 13 and having a lower thermal conductivity than that of a metal layer such as a heat insulating material. Examples of a metal material formed of a metal layer having a large thermal conductivity include copper, aluminum, iron, and stainless steel.

For example, casing 11 can be formed of a three-layer laminated body obtained by combining three different materials. Examples of the laminated body include a structure in which an aluminum panel, rock wool (for example, MG board 080 (manufactured by NICHIAS Corporation), and the like), and a plated steel plate are laminated in this order. The aluminum panel can be disposed as the inner surface of casing 11 (the surface in contact with the internal space of casing 11). When casing 11 is a three-layer laminated body of an aluminum panel, rock wool, and a plated steel plate, a tracing pipe made of, for example, copper, as a heat source unit 13 to be described later, is disposed on the surface in contact with the internal space of casing 11 in the aluminum panel, whereby heat can be efficiently transferred to the heat medium (described later) with which the internal space of casing 11 is filled.

It is preferable that casing 11 can form an enclosed space. For example, it is preferable that, when a through hole for disposing a pipe (source gas flow pipe 17, permeate gas flow pipe 18, retentate gas flow pipe 19) and the like is provided in casing 11, or casing 11 includes a plurality of panels, a heat insulating material or a sealant is preferably applied to, filled in, or affixed to a joint part between casing 11 and the pipe or a joint part between a plurality of panels forming casing 11, to suppress the intrusion of external air into the internal space of casing 11 and the leakage of the heat medium in casing 11 to the outside of casing 11.

The internal space of casing 11 is filled with the heat medium, and the heat medium is used to maintain the temperature of the gas flowing in separation membrane module M. The heat medium in casing 11 is preferably heated or cooled by heat source unit 13 as described later. The heat medium in casing 11 is a fluid, and as the heat medium, a gas such as air, nitrogen, helium, steam, carbon dioxide, or an organic heat medium, or a liquid such as water or an organic medium (such as an oil) may be used. It is preferable to use a gas, and it is more preferable to use air.

In gas separation apparatus 10 shown in FIG. 1, for example, by installing separation membrane modules M on a holding frame 12 provided in casing 11, separation membrane modules M can be integrated in a horizontal direction and a vertical direction. Separation membrane module M is preferably held by holding frame 12 and the like and provided so that a space is formed between separation membrane module M and the floor surface of casing 11 without being provided to be grounded on the floor surface in casing 11. The details are omitted in FIG. 1, but holding frame 12 preferably has a structure capable of supporting and fixing each separation membrane module M. In order to fix the position of each of separation membrane modules M in casing 11, separation membrane modules M adjacent to each other in at least one of a horizontal direction, a vertical direction and an oblique direction are preferably connected and fixed to each other by a connecting part provided in housing 15. When holding frame 12 is installed on the floor surface of casing 11, a material that suppresses heat conduction or heat transfer may be installed between the holding frame 12 and the floor surface of casing 11 in order to suppress heat transfer from holding frame 12 to the floor surface, and holding frame 12 may be covered with the material that suppresses heat conduction or heat transfer. As the material that suppresses heat conduction or heat transfer, for example, a mixed material of a glass fiber and resin (for example, REGISUL K (manufactured by NICHIAS Corporation) and the like) can be used.

In gas separation apparatus 10 shown in FIG. 1, as one example, five products (hereinafter, sometimes referred to as a "horizontal separation membrane module group") in which five separation membrane modules M are installed in the horizontal direction are stacked and disposed in the vertical direction. The number of separation membrane modules M disposed in the horizontal direction and the number of separation membrane module groups in the horizontal direction are not limited thereto, and can be appropriately selected depending on the size of the inner space of casing 11 and the sizes of separation membrane modules M. From the viewpoint of the integration efficiency of separation membrane modules M, the most possible separation membrane modules M are preferably integrated in casing 11. From the viewpoint of reducing the heat dissipation area of casing 11 (the area of the outer surface of the casing) to improve the heat retention efficiency in casing 11, casing 11 preferably has the smallest possible internal space within a range in which the separation membrane modules M to be integrated can be held. For example, when the separation membrane module M having a diameter of 5 to 50 cm and a length of 0.5 to 5 m is used, 2 to 20 separation membrane modules M are preferably provided in the horizontal direction, and 2 to 20 separation membrane modules M are preferably provided in the vertical direction.

The arrangement of separation membrane modules M in the separation membrane module group in the horizontal direction is not particularly limited, but separation membrane modules M are preferably disposed in parallel with each other from the viewpoint of improving the integration efficiency. FIG. 1 shows an example in which one separation membrane module M is disposed in the axial direction of separation membrane module M, but greater than or equal to two separation membrane modules M may be disposed in series in the axial direction of the separation membrane modules M. FIG. 1 shows an example in which separation membrane modules M are disposed so that the axial directions of separation membrane modules M are parallel in both the horizontal direction and the vertical direction. The axial directions of the separation membrane module groups in the horizontal direction adjacent to each other in the vertical direction may be parallel to each other or may cross each other. Furthermore, as shown in FIG. 1, when the separation membrane modules M are disposed so that the axial directions of the separation membrane modules M are parallel in both the horizontal direction and the vertical direction, in the cross section orthogonal to the axial direction of separation membrane modules M, the separation membrane modules M may be disposed in a staggered manner.

Separation membrane modules M disposed in casing 11 are preferably disposed in a state where the smallest possible distance between separation membrane modules M is set in a range where a necessary pipe to be described later can be disposed, and separation membrane modules M and pipes connected thereto can be maintained and managed. Thereby, separation membrane modules M can be disposed in a state where the number of separation membrane modules M in casing 11 is increased as compared with that when the distance between separation membrane modules M is increased. The arrangement of separation membrane modules M in casing 11 is more preferably set so that the convection of the heat medium in casing 11 is effectively generated.

Gas separation membrane element 1 in separation membrane module M held in casing 11 is replaced at an appropriate timing depending on the service life and the like. Therefore, separation membrane module M itself may be detachably provided in casing 11 so that separation membrane module M can be replaced. Alternatively, gas separation membrane element 1 in housing 15 of separation membrane module M may be replaced. Housing 15 may be removably mounted in casing 11, or may be fixedly mounted. By replacing gas separation membrane element 1 lighter than separation membrane module M, the burden of the replacement work of gas separation membrane element 1 can be suppressed. When separation membrane module M or gas separation membrane element 1 is replaceably mounted in casing 11, the arrangement of separation membrane module M in casing 11 or the shape of casing 11 is preferably set so that the burden of replacement work can be reduced. For example, when housing 15 of separation membrane module M includes a cylindrical member and a blocking member for blocking both the axial ends of the cylindrical member, the blocking member of housing 15 may be removed, to insert and remove gas separation membrane element 1 in the axial direction of cylindrical member of housing 15, thereby attaching and detaching gas separation membrane element 1. In this case, only a part of the surface of casing 11 that intersects with the axial direction of the cylindrical member may be removable so that gas separation membrane element 1 can be inserted and removed in the axial direction. A part of the surface removed from casing 11 may be removed as a single panel, or may be split into greater than or equal to two panels and removed in consideration of the ease of attachment and removal, and transportation.

From the viewpoints of the effective convection of the heat medium in casing 11 and the replacement work of gas separation membrane element 1, the external volume efficiency of the separation membrane modules M integrated in casing 11 is preferably 50% or less, and more preferably 25% or less. The external volume efficiency is calculated by the following formula:

$$\text{external volume efficiency} = (\text{external volume of separation membrane module M}/\text{external volume of casing 11}) \times 100.$$

However, if the external volume efficiency is too small, the size of casing 11 becomes too large, and the integration efficiency of separation membrane modules M decreases, whereby the external volume efficiency is preferably greater than or equal to 5%. Here, the external volume of separation membrane module M is the external volume of a body portion of housing 15 that forms a space for disposing gas separation membrane element 1. When housing 15 includes a cylindrical member and a blocking member at each of both the axial ends of the cylindrical member, the external volume of separation membrane module M is the external volume of the cylindrical member.

[Heat Source Unit]

Gas separation apparatus 10 can include heat source unit 13 for adjusting the temperature of the internal space of casing 11. Examples of heat source unit 13 include a heating unit for heating the heat medium in casing 11, a cooling unit for cooling the heat medium in casing 11, and a heating/cooling unit having functions of heating and cooling the heat medium in casing 11. Heat source unit 13 is provided, whereby the heat medium with which the internal space of casing 11 is filled can be heated or cooled; housing 15 of separation membrane module M disposed in casing 11, and the gas and the like flowing in gas separation membrane element 1 in separation membrane module M and in separation membrane module M can be heated or cooled to a temperature required for performing the gas separation treatment; and the gas flowing in separation membrane module M during the gas separation treatment can be maintained at an intended temperature. One of the heating unit and the cooling unit may be provided as heat source unit 13 in casing 11, but both the heating unit and the cooling unit may be provided to heat and cool the heat medium in casing 11, or the heating/cooling unit may be provided.

In gas separation apparatus 10 shown in FIG. 1, an example in which heat source unit 13 is provided on the floor surface in casing 11 is shown. Heat source unit 13 may be installed at any position in casing 11. In addition to the floor surface shown in FIG. 1, a space may be provided on the side wall surface or ceiling surface of casing 11, between separation membrane modules M adjacent to each other, and between the floor surface, side wall surface or ceiling surface of casing 11 and separation membrane module M closest to these surfaces. These may be optionally combined. Heat source unit 13 can be provided, for example, on the floor surface and the side wall surface in casing 11. In order to easily maintain the temperature of the gas flowing in the separation membrane module in casing 11, heat source unit 13 is preferably provided so as not to be in direct contact with the outer wall surface of housing 15 of separation membrane module M, and the outer wall surface of the pipe (source gas flow pipe 17, permeate gas flow pipe 18, and retentate gas flow pipe 19).

In gas separation apparatus 10 shown in FIG. 1, an example in which heat source unit 13 is provided in casing 11 is shown, but gas separation apparatus 10 is not limited thereto. Heat source unit 13 may be installed outside casing 11, or may be provided both inside and outside casing 11. However, from the viewpoint of the amount of energy required to adjust the temperature of the heat medium in casing 11, heat source unit 13 is preferably provided inside casing 11. When heat source unit 13 is provided between separation membrane modules M adjacent to each other, the integration degree of the separation membrane modules M may be reduced, and the size of the casing 11 may also be increased, to increase the size of gas separation apparatus 10. Therefore, heat source unit 13 is preferably provided on the floor surface, side wall surface, and ceiling surface of casing 11 to downsize gas separation apparatus 10.

Heat source unit 13 is not particularly limited as long as it can adjust the gas flowing in separation membrane module M to an intended temperature. For example, when gas separation apparatus 10 includes an acidic gas separation membrane element, it is preferable that the temperature of the heat medium in casing 11 is usually maintained at 0 to 150° C., whereby the type, heat transfer area, and arrangement and the like of the heat source unit 13 are preferably selected so that the temperature can be realized. The heat medium in casing 11 is also preferably selected depending on the temperature.

When the heat source unit 13 is installed in the casing 11, for example, a jacket heater, a tracing pipe, a fin tube, a resistance heating element, an induction heating device, microwave irradiation, and a thermo cooler and the like may be used as heat source unit 13. These can be used alone or in combination. When heat source unit 13 is installed outside casing 11, for example, a heat medium such as air adjusted to a predetermined temperature by a heat exchanger installed outside casing 11, or steam generated by a steam generator and the like may be fed into casing 11 by using a blower and the like, or the heat medium in the internal space of casing 11 may be fed to the heat exchanger installed outside the casing 11 using a blower and the like to adjust the heat medium to a predetermined temperature, and the temperature-adjusted heat medium may be fed to casing 11 to circulate the heat medium in casing 11. These may be performed alone or in combination. As a medium flowing in the jacket heater, the tracing pipe, the fin tube, and the heat exchanger and the like, a liquid such as water or an oil, or a gas such as steam or heated air can be used. As the medium, a process gas in the pre-treatment and post-treatment steps of the source gas and/or the permeate gas and/or the retentate gas may be utilized. A process gas as a heat source for adjusting the temperature of the medium, or the waste heat of exhaust gas generated in the process may be utilized. The waste heat of the process gas in the pre-treatment and the post-treatment steps may be used.

When the tracing pipe is used as heat source unit 13, and a plurality of tracing pipes are connected to extend the tracing pipe, a fluid flowing in the tracing pipe may leak. Therefore, the length of the tracing pipe and the arrangement of the tracing pipe are preferably selected so as to reduce the number of connecting parts of the tracing pipe as much as possible. When the tracing pipe is constructed, a tracing pipe with less bending work is preferably installed in order to avoid the occurrence of breakage and fracture and the like in the tracing pipe in the bending step of the tracing pipe. The tracing pipes are preferably disposed so that a distance between the tracing pipes adjacent to each other is set to greater than or equal to 0.05 m and less than or equal to 0.3 m, for example, 0.1 m. The tracing pipes are preferably disposed on the same plane. The tracing pipe is preferably made of copper having a high thermal conductivity. The tracing pipe preferably has an inner diameter of greater than or equal to 6 mm and a thickness of greater than or equal to 2 mm. For example, the tracing pipe can preferably have an inner diameter of 10 mm and a thickness of 2 mm. When steam is used as the fluid flowing in the tracing pipe, the condensation of the steam may cause condensed water to adhere to a steam supply port, whereby the steam supply port is preferably provided at a position where the condensed water is discharged by its own weight. In order to discharge the condensed water without reducing the pressure in the tracing pipe, a steam trap is preferably provided at a condensed water discharge port.

Heat source unit 13 is preferably provided so that heat source unit 13 allows heating or cooling while suppressing the temperature unevenness of the heat medium in casing 11, but in order to reduce temperature unevenness in casing 11, a fan for causing the heat medium in casing 11 to flow, and the like may be provided. From the viewpoints of efficiently heating or cooling the heat medium in casing 11 and keeping it warm, and reducing the temperature unevenness of the heat medium in casing 11, heat source unit 13 is preferably provided along the floor surface and side wall surface of casing 11.

[Pipe]

Gas separation apparatus 10 shown in FIG. 1 can include a pipe for feeding a source gas to separation membrane module M, or a pipe for discharging a permeate gas and a retentate gas discharged from separation membrane module M. Specifically, gas separation apparatus 10 can include a source gas flow pipe 17, a permeate gas flow pipe (exhaust gas flow pipe) 18, and a retentate gas flow pipe (exhaust gas flow pipe) 19. For example, these pipes penetrate through the lower part (floor surface side) of casing 11, and are disposed inside and outside casing 11. In FIG. 1, with respect to a branched part 20 and a collecting part 21 to be described later, only a part of the branched part and collecting part present in FIG. 1 are denoted by reference numerals for convenience of drawing figure.

The source gas flow pipe 17 can be used as a pipe for feeding the source gas from the outside of casing 11 to separation membrane module M held in casing 11. Source gas flow pipe 17 can include branched part 20 in which the pipe for feeding the source gas is branched so that the source gas can be distributed and fed to all separation membrane modules M in casing 11 from one end (right side in FIG. 1) of separation membrane module M in the axial direction.

Figure 5:
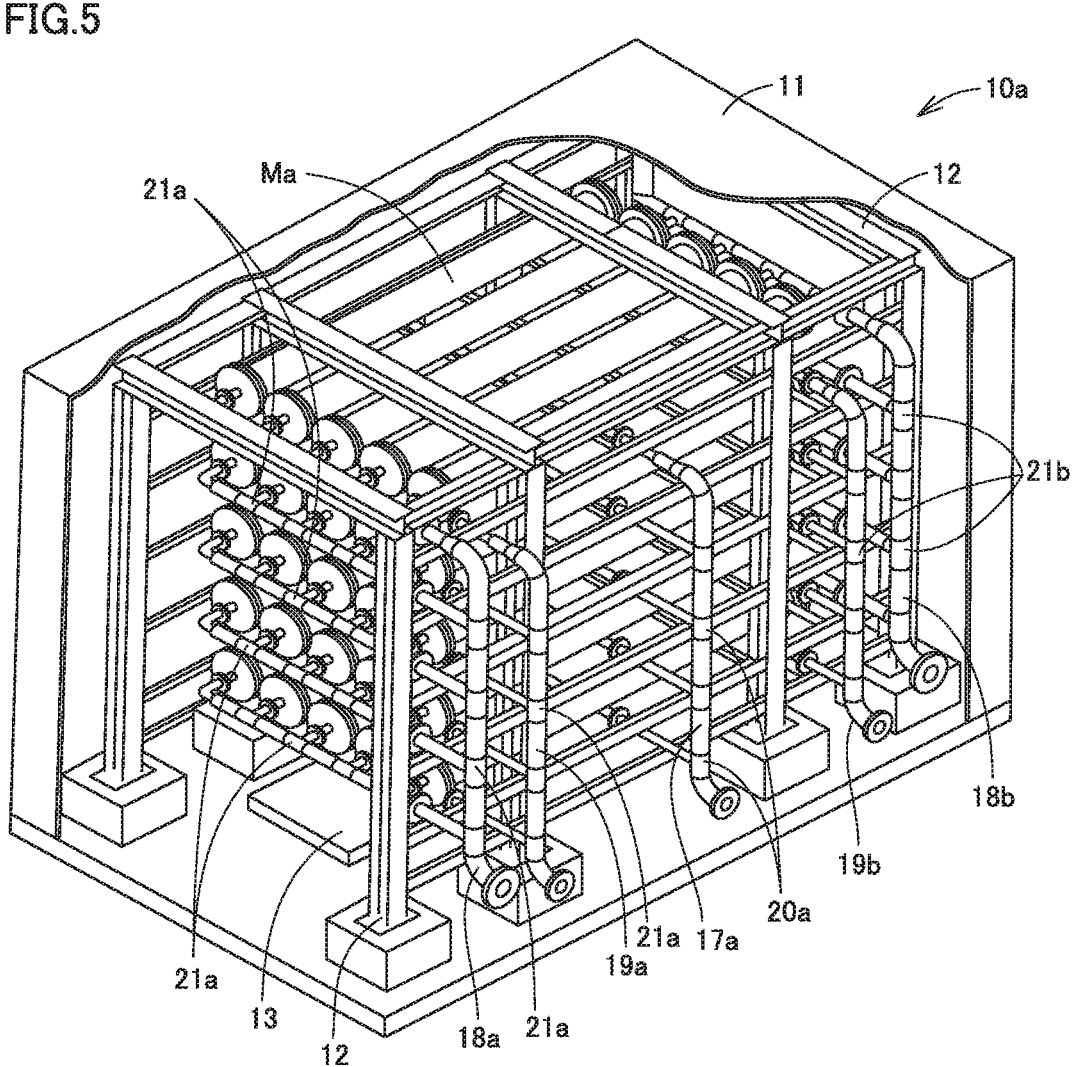
FIG. 5 is a schematic perspective view showing other example of a gas separation apparatus of the present invention, in which a partially cutaway portion is provided.

In gas separation apparatus 10 shown in FIG. 1, the case where a part of branched parts 20 of source gas flow pipe 17 are provided outside casing 11 is shown, but as shown in FIG. 5 to be described later, all branched parts 20 of source gas flow pipe 17 are preferably provided inside casing 11. A connecting part of source gas flow pipe 17 and each separation membrane module M may also be provided outside casing 11, but the connecting part is preferably provided in casing 11 as shown in FIG. 1. In branched part 20 and the connecting part, the presence of a flange and the like causes the outer surface having a large undulation, which makes it difficult to directly cover the outer surface with the heat source unit. Thus, branched part 20 and the connecting part are apt to cause a cool spot or a hot spot. Therefore, it is preferable that, by disposing branched part 20 and the connecting part in casing 11, and heating or cooling branched part 20 and the connecting part together with separation membrane module M in casing 11, the fluctuation and unevenness of the temperature of the gas flowing in separation membrane module M are suppressed.

Permeate gas flow pipe 18 can be used as a pipe for discharging the permeate gas from separation membrane module M held in casing 11 to the outside of casing 11. Permeate gas flow pipe 18 can include a collecting part 21 in which the pipes that discharge the permeate gas converge so that the permeate gas that permeates through gas separation membrane 2 of gas separation membrane element 1, of the source gas from the other axial end (left side in FIG. 1) of all separation membrane modules M in casing 11 can be collected and discharged.

In gas separation apparatus 10 shown in FIG. 1, a case where a part of the collecting parts of permeate gas flow pipe 18 are provided outside casing 11 is shown. However, as shown in FIG. 5 to be described later, all collecting parts 21 of permeate gas flow pipe 18 are preferably provided in casing 11. The connecting part between the permeate gas flow pipe 18 and each separation membrane module M may also be provided outside casing 11, but it is preferably provided in casing 11 as shown in FIG. 1. The presence of the flange and the like causes the collecting part 21 and the connecting part having the outer surface having a large undulation, which makes it difficult to directly cover the outer surface with the heat source unit. Thus, collecting part 21 and the connecting part are apt to cause a cool spot or a hot spot. Therefore, by disposing collecting part 21 and the connecting part in casing 11, and heating or cooling collecting part 21 and the connecting part together with separation membrane module M in casing 11, the fluctuation and unevenness of the temperature of the permeate gas that has permeated through gas separation membrane 2 of separation membrane module M are preferably suppressed.

Retentate gas flow pipe 19 can be used as a pipe for discharging the retentate gas from separation membrane module M held in casing 11 to the outside of casing 11. Retentate gas flow pipe 19 can include a collecting part 21 in which the pipes that discharge the retentate gas converge so that the retentate gas that has not permeated through gas separation membrane 2 of gas separation membrane element 1, of the source gases can be collected and discharged from all separation membrane modules M in casing 11.

In gas separation apparatus 10 shown in FIG. 1, a case where a part of collecting parts 21 of retentate gas flow pipe 19 are provided outside casing 11 is shown. However, as shown in FIG. 5 to be described later, all collecting parts 21 of retentate gas flow pipe 19 are preferably provided in casing 11. The connecting part between retentate gas flow pipe 19 and each separation membrane module M may also be provided outside casing 11, but it is preferably provided in casing 11 as shown in FIG. 1. The presence of the flange and the like causes the collecting part 21 and the connecting part having the outer surface having a large undulation, which makes it difficult to directly cover the outer surface with the heat source unit. Thus, collecting part 21 and the connecting part are apt to cause a cool spot or a hot spot. Therefore, it is preferable that, by disposing collecting part 21 and connecting part in casing 11, and heating or cooling collecting part 21 and connecting part together with separation membrane module M in casing 11, the fluctuation and unevenness of the temperature of the retentate gas that has not permeated through gas separation membrane 2 of separation membrane module M are suppressed.

Branched part 20, collecting part 21, and connecting part are disposed in casing 11, whereby, when the gas flowing in the pipes (source gas flow pipe 17, permeate gas flow pipe 18 and retentate gas flow pipe 19) contains a condensable component such as steam, the condensation of the condensable component can be suppressed. The pipe may include a condensate liquid discharge part for discharging a condensate liquid in which the condensable component condenses. It is preferable that the condensate liquid discharge part is installed at a position lower than the bottom surface of lowermost separation membrane module M in casing 11, and the pipe has a slope so that the condensate liquid generated in the pipe is discharged by its own weight in the condensate liquid discharge part. It is preferable that, when the condensate liquid discharge part is not provided, the pipe penetrates through casing 11 at a position lower than the bottom surface of lowermost separation membrane module M in casing 11. In this case, a condensate liquid discharge part is preferably provided outside gas separation apparatus 10. It is preferable that the condensed water discharged from the condensate liquid discharge part is continuously or intermittently discharged to the outside.

The number and arrangement of source gas flow pipes 17, permeate gas flow pipes 18, and retentate gas flow pipes 19 may be selected depending on the arrangement and number of separation membrane modules M, and the arrangement and number of gas separation membrane elements 1 provided in separation membrane module M. In gas separation apparatus 10 shown in FIG. 1, the case has been described, where one source gas flow pipe 17, one permeate gas flow pipe 18, and one retentate gas flow pipe 19 are provided, and each pipe is connected to all separation membrane modules M in casing 11. For example, separation membrane modules M in casing 11 may be grouped, and a plurality of source gas flow pipes 17, a plurality of permeate gas flow pipes 18, and a plurality of retentate gas flow pipes 19 may be provided for each group.

In gas separation apparatus 10 shown in FIG. 1, pipes (source gas flow pipe 17, permeate gas flow pipe 18, and retentate gas 19) that feed or discharge gases in parallel to plurality of separation membrane modules M integrated in casing 11 are shown, but gas separation apparatus 10 may include pipes other than these. For example, pipes may be provided to feed source gases in series to plurality of separation membrane modules M integrated in casing 11. That is, a pipe may be provided to feed the permeate gas and/or the retentate gas discharged from separation membrane module M in casing 11 to other separation membrane module M in casing 11.

For example, other gas separation apparatuses as shown in FIG. 5 may be used. FIG. 5 is a schematic perspective view showing other example of a gas separation apparatus, in which a partially cutaway portion is provided. A gas separation apparatus 10a shown in FIG. 5 is particularly different from gas separation apparatus 10 shown in FIG. 1 in the structure of a pipe for feeding or discharging gases in parallel to a plurality of separation membrane modules Ma integrated in casing 11. In gas separation apparatus 10a, two gas separation membrane elements 1 are disposed in series in housing 15 of separation membrane module Ma in casing 11, as shown in FIG. 4B. Furthermore, gas separation apparatus 10a is different from gas separation apparatus 10 shown in FIG. 1 also in that all branched parts 20a of a source gas flow pipe 17a, all collecting parts 21a and 21b of permeate gas flow pipes 18a and 18b, and all collecting parts 21a and 21b of retentate gas flow pipe 19a and 19b are disposed in casing 11. In FIG. 5, with respect to branched parts 20a and collecting parts 21a and 21b, only a part of the branched parts and collecting parts present in FIG. 5 are denoted by reference numerals for convenience of drawing figure.

In gas separation apparatus 10a shown in FIG. 5, in order to feed the source gas to each of two gas separation membrane elements 1 in separation membrane module Ma, source gas flow pipe 17a is provided at the axial center part of separation membrane module Ma. Permeate gas flow pipes 18a and 18b and retentate gas flow pipes 19a and 19b are provided at both the axial ends of separation membrane module Ma. Source gas flow pipe 17a including branched part 20a, and permeate gas flow pipes 18a and 18b and retentate gas flow pipes 19a and 19b including collecting parts 21a and 21b are the same as the descriptions of source gas flow pipe 17, permeate gas flow pipe 18, and retentate gas flow pipe 19. Source gas flow pipe 17a, permeate gas flow pipes 18a and 18b, and retentate gas flow pipes 19a and 19b being disposed inside and outside casing 11 so as to penetrate through the lower part (floor surface side) of casing 11 are also the same as the descriptions of source gas flow pipe 17, permeate gas flow pipe 18, and retentate gas flow pipe 19.

Gas separation apparatus 10a is different from gas separation apparatus 10 shown in FIG. 1 in that all branched parts 20a of source gas flow pipe 17a, all collecting parts 21a and 21b of permeate gas flow pipes 18a and 18b, and all collecting parts 21a and 21b of retentate gas flow pipe 19a and 19b are provided in casing 11. Therefore, in gas separation apparatus 10a, by disposing branched parts 20a, collecting parts 21a and 21b, and all the connecting parts described above in casing 11, and heating or cooling branched parts 20a, collecting parts 21a and 21b, and the connecting parts together with separation membrane module M in casing 11, the fluctuation and unevenness of the temperature of the gas flowing in gas separation membrane 2 of separation membrane module M can be further suppressed as compared to the case where these are disposed outside casing 11.

In gas separation apparatus 10a, the source gas is fed from source gas flow pipe 17a in parallel to two gas separation membrane elements 1 in each separation membrane module Ma. The permeate gas that has permeated through gas separation membranes 2 of two gas separation membrane elements 1 in each separation membrane module Ma is discharged through permeate gas flow pipes 18a and 18b, and the retentate gas that has not permeated through gas separation membrane 2 is discharged through retentate gas flow pipe 19a and 19b.

[Other Device]

Gas separation apparatus 10 may include a pressure adjusting unit. The pressure adjusting unit can pressurize or depressurize the inside of the casing 11 when the heat medium with which the casing 11 is filled is steam. Thereby, the temperature of the steam that is the heat medium in casing 11 can be adjusted. When a condensable component such as steam contained as the heat medium, gas separation apparatus 10 preferably includes a discharge mechanism for discharging the condensate liquid condensing in casing 11 from the inside of casing 11. For example, it is possible to provide a condensate liquid discharge part that penetrates through the lower part (floor surface side) of casing 11 to discharge the condensate liquid from the inside of casing 11 to the outside. It is preferable that the condensed water discharged from the condensate liquid discharge part is continuously or intermittently discharged to the outside.

Gas separation apparatus 10 may include a temperature measurement unit. The temperature measurement unit functions in conjunction with the above-described heat source unit 13 in order to adjust a heating amount and a cooling amount applied to the heat medium in casing 11. The temperature measurement unit can be installed at any position so that the temperature of at least one of the heat medium in casing 11, the gas in separation membrane module M, the gas in the pipe connected to separation membrane module M, the inside or/and surface of the layer forming casing 11, the surface of the pipe provided inside casing 11, the surface of housing 15 of separation membrane module M, and the external air outside the casing 11 can be measured, and the temperature measurement unit may be installed at one or two or more positions. When the temperature of the heat medium in casing 11 is measured, the temperature measurement unit is preferably installed at a position sufficiently away from heat source unit 13 so as not to be directly influenced by the temperature change of heat source unit 13.

The temperature measurement unit for measuring the temperature in casing 11 can be provided, for example, so as not to be in contact with separation membrane module M and casing 11 at two places in the internal space near the central part of the floor surface of casing 11 and the central part of the ceiling surface. The temperature measurement unit for measuring the temperature of the source gas can be provided, for example, at two places in a portion of source gas flow pipe 17 that penetrates through casing 11, and the pipe near the connecting part with separation membrane module M in casing 11.

The gas separation apparatus may include an initial temperature adjusting unit separately from heat source unit 13. The initial temperature adjusting unit adjusts housing 15 of separation membrane module M disposed in casing 11, and the gas flowing in gas separation membrane element 1 in separation membrane module M and separation membrane module M to a temperature required when the gas separation treatment is performed, before the start of the gas separation treatment. By providing the initial temperature adjusting unit, a time required for the above-described temperature adjustment performed before the start of the gas separation treatment can be shortened. The initial temperature adjusting unit to be used may be the same as heat source unit 13 described above, but it is preferable to select one that does not increase the size of casing 11. For example, a tracing pipe installed on the outer wall surface of separation membrane module M can be used as the initial temperature adjusting unit.

<Gas Separation Method>

A gas separation method of the present embodiment is a gas separation method using the gas separation apparatus, and includes the steps of: adjusting a temperature of a heat medium with which a casing 11 is filled so that the temperature is maintained at a predetermined temperature using a heat source unit 13; and feeding a source gas to a separation membrane module M to perform a gas separation treatment.

The temperature adjusting step includes at least one of the step of heating the heat medium in the internal space of casing 11 and the step of cooling the heat medium in the internal space of casing 11, and may include both the steps.

Hereinafter, in gas separation apparatus 10, the gas separation method in the case of separating $CO_2$ as the acidic gas from the source gas using the above-described spiral-type gas separation membrane element for acidic gas will be described as an example.

In gas separation apparatus 10, it is preferable that separation membrane module M including greater than or equal to one gas separation membrane elements 1 in housing 15 is held in casing 11 before the start of the gas separation treatment, and heat source unit 13 then heats or cools the heat medium in the internal space of casing 11 to maintain the heat medium in casing 11 at an intended temperature. After the temperature in casing 11 reaches the intended temperature, and the temperature of the heat medium of casing 11 is in a steady state, the source gas containing $CO_2$ and steam can be fed to source gas flow pipe 17 to start a gas separation treatment. It is preferable that the temperature and humidity of the source gas fed to source gas flow pipe 17 are preliminarily adjusted by a humidity controller that performs humidification or dehumidification, selected from the group consisting of a heat exchanger, a gas-liquid separator, a compressor, a water addition device, and a decompressor and the like.

The source gas fed to source gas flow pipe 17 is distributed and fed to each separation membrane module M held in casing 11. In separation membrane module M, the source gas is continuously fed to feed-side flow channel member 3 of gas separation membrane element 1 from feed-side end part 31 shown in FIG. 3 (arrow a in FIG. 3), and $CO_2$ contained in the source gas flowing in feed-side flow channel member 3 permeates through gas separation membrane 2. The permeate gas that has permeated through gas separation membrane 2 flows in permeate-side flow channel member 4, and is fed from a hole 30 to central tube 5. The gas is continuously collected via a discharge port 32 connected to the discharge side of central tube 5 and provided in housing 15 (arrow b in FIG. 3), and fed to permeate gas flow pipe 18. Meanwhile, the retentate gas that has not permeated through gas separation membrane 2 is continuously discharged from discharge-side end part 33 of separation membrane module M (arrow c in FIG. 3), and fed to retentate gas flow pipe 19. Thereby, $CO_2$ can be separated from the source gas.

While the gas separation treatment as described above is performed, the internal space of the casing 11 is blocked from the external air outside the casing 11, whereby heat source unit 13 can efficiently heat or cool the heat medium in casing 11 to maintain the heat medium at the desired temperature.

In order to integrate the separation membrane modules M, a fixing part for fixing separation membrane modules M to holding frame 12 for integrating, and a connecting part for connecting separation membrane modules M, or the separation membrane module M and the pipe may be provided. In gas separation apparatus 10 of the present embodiment, a fixing part and a connecting part that are considered to be less likely to be directly covered with a heat source unit such as a jacket heater are also provided in casing 11. Therefore, in gas separation apparatus 10, in addition to all integrated separation membrane modules M, the fixing part and the connecting part attached to separation membrane modules M can also be kept warm by the heat medium in casing 11, whereby a hot spot or cool spot occurring in separation membrane module M or the pipe can be suppressed to suppress the fluctuation and unevenness of the temperature of the gas flowing in separation membrane modules M.

In particular, in gas separation apparatus 10 of the present embodiment, even when the number of separation membrane modules M to be integrated, including gas separation membrane elements is increased, the integrated separation membrane modules M are kept warm by the heat medium in casing 11, whereby a large amount of source gas can be subjected to a gas separation treatment while a hot spot or cool spot occurring in each separation membrane module M or pipe is suppressed.

In general, as the temperature of the source gas is higher, the permeation performance of the gas separation membrane element tends to be able to be improved. As the humidity of the source gas is higher in addition to the temperature of the source gas, the permeation performance of the gas separation membrane element including the gas separation membrane utilizing the facilitated transport mechanism tends to be able to be improved. The humidity of the source gas is determined by the balance between the amount of steam and temperature of the source gas. Therefore, it is preferable that the temperature of the source gas is accurately managed. As described above, it can be expected that a hot spot or cool spot occurring in separation membrane module M or the pipe is suppressed to suppress the fluctuation and unevenness of the temperature of the gas flowing in separation membrane module M, whereby the stabilization of the gas separation performance can be expected.

For example, in the spiral-type gas separation membrane element for acidic gas, the source gas contains $CO_2$ and steam, and the hydrophilic resin is used for gas separation membrane 2, so that the steam may condense in a range where the temperature is lower when the unevenness of the temperature occurs in the gas separation treatment. The condensed water produced by the condensation of the steam may deteriorate the membrane performance of gas separation membrane element 1, which makes it difficult to maintain stable gas separation performance. In gas separation apparatus 10 of the present embodiment, separation membrane modules M integrated in casing 11 can be wholly kept warm, including the fixing part and the connecting part, whereby a hot spot or cool spot occurring in separation membrane module M or the pipe can be suppressed to suppress the fluctuation and unevenness of the temperature of the gas flowing in separation membrane module M. As a result, it can be expected that the condensation of the steam contained in the source gas, the permeate gas, and the retentate gas is suppressed, and the deterioration of the membrane performance of gas separation membrane element 1 is suppressed, which maintains stable gas separation performance.

Gas separation apparatus 10 of the present embodiment can also be expected to have an effect of improving energy efficiency particularly when separation membrane modules M are integrated at a high density. For example, when a heat source unit such as a heat jacket is provided on the outer wall surfaces of separation membrane modules M to integrate separation membrane modules M and the heat source unit, and individually heat or cool separation membrane modules M, a surface area in contact with external air increases with the increase in the number of separation membrane modules M to be integrated, to increase a heat release area, which causes increased energy required to maintain the temperature of the gas flowing in each separation membrane module M. Meanwhile, in gas separation apparatus 10 according to the present embodiment, separation membrane modules M can be integrated and provided in casing 11, and the heat release amount of the heat medium in casing 11 whose the temperature is adjusted by heat source unit 13 depends on the area of the outer surface of casing 11. Therefore, when the separation membrane modules are integrated at a high density so that the area of the outer surface of casing 11 can be made smaller than the sum of the surface areas of separation membrane modules M integrated in casing 11, the energy required to maintain the temperature of the gas flowing in separation membrane modules M can be suppressed to improve the energy efficiency.

Hereinafter, the calculation results (Examples 1 to 5) of the heat release area, heat release amount, and external volume efficiency when the integrated separation membrane modules M are held in casing 11, and the calculation results (Comparative Examples 1 to 5) of the heat radiation area and heat radiation amount when the separation membrane modules M are not held in casing 11 are shown in comparison.

The conditions used for the calculation are as follows. When the outer surfaces of the separation membrane module, casing, and pipe are covered with the composite material including the heat insulating material, composite materials having the same overall heat-transfer coefficient and thickness are applied as composite materials of Examples and Comparative Examples so that Examples and Comparative Examples are easily compared.

[Type of Separation Membrane Module]

Separation Membrane Module M1:

Cylindrical member: Stainless steel cylinder having a diameter of 23 cm, a length of 1.6 m, and a sheet thickness of 0.6 cm Blocking member: Stainless steel plate having a diameter of 38 cm and a sheet thickness of 4.1 cm (both end parts of the cylindrical member)

Surface area: 1.38 m$^2$ (including the cylindrical member and the blocking member)

Number of gas separation membrane elements to be held: 1 (see FIG. 4A)

Separation Membrane Module M2:

Cylindrical member: Stainless steel cylinder having a diameter of 23 cm, a length of 2.9 m, and a sheet thickness of 0.6 cm Blocking member: Stainless steel plate having a diameter of 38 cm and a sheet thickness of 4.1 cm (both end parts of the cylindrical member)

Surface area: 2.32 m$^2$ (including the cylindrical member and the blocking member)

Number of gas separation membrane elements to be held: 2 (see FIG. 4B)

Separation Membrane Module M3:

Cylindrical member: Stainless steel cylinder having a diameter of 23 cm, a length of 5.5 m, and a sheet thickness of 0.6 cm Blocking member: Stainless steel plate having a diameter of 38 cm and a sheet thickness of 4.1 cm (both end parts of the cylindrical member)

Surface area: 4.20 m$^2$ (including the cylindrical member and the blocking member)

Number of gas separation membrane elements to be held: 4 (see FIG. 4C)

Separation Membrane Module M4:

The separation membrane module M4 is the same as separation membrane module M1 except that the separation membrane module includes the jacket so as to cover the outer surface of the cylindrical member, and the outer surfaces of the jacket and blocking member are covered with the composite material including the heat insulating material. However, the jacket is provided on the outer surface of the cylindrical member, so that the diameters of the cylindrical member and blocking member are 1.5 times those of the separation membrane module M1.

Surface area: 5.37 m$^2$ (the outer surface of the composite material covering the outer surfaces of the jacket and blocking member)

Overall heat-transfer coefficient of the composite material covering the outer surfaces of the jacket and blocking member: 0.44 W/(m$^2$·K)

The thickness of the composite material covering the outer surfaces of the jacket and blocking member: 21 cm Gas Separation Membrane Module M5:

The separation membrane module M5 is the same as separation membrane module M2 except that the separation membrane module includes the jacket so as to cover the outer surface of the cylindrical member, and the outer surfaces of the jacket and blocking member are covered with the composite material including the heat insulating material. However, the jacket is provided on the outer surface of the cylindrical member, so that the diameters of the cylindrical member and blocking member are 1.5 times those of separation membrane module M2.

Surface area: 8.49 m$^2$ (the outer surface of the composite material covering the outer surfaces of the jacket and blocking member)

Overall heat-transfer coefficient of the composite material covering the outer surfaces of the jacket and blocking member: 0.44 W/(m$^2$·K)

The thickness of the composite material covering the outer surfaces of the jacket and blocking member: 21 cm Gas Separation Membrane Module M6:

The separation membrane module M6 is the same as separation membrane module M3 except that the separation membrane module includes the jacket so as to cover the outer surface of the cylindrical member, and the outer surfaces of the jacket and blocking member are covered with the composite material including the heat insulating material. However, the jacket is provided on the outer surface of the cylindrical member, so that the diameters of the cylindrical member and blocking member are 1.5 times those of separation membrane module M3.

Surface area: 14.74 m$^2$ (the outer surface of the composite material covering the outer surfaces of the jacket and blocking member)

Overall heat-transfer coefficient of the composite material covering the outer surfaces of the jacket and blocking member: 0.44 W/(m$^2$·K)

The thickness of the composite material covering the outer surfaces of the jacket and blocking member: 21 cm

[Integration Form]

Integration Form (1):

Arrangement of separation membrane modules M: 5 modules in a horizontal direction ×5 modules in a vertical direction Total number of separation membrane modules M: 25 modules Integration Form (2):

Arrangement of separation membrane modules M: 10 modules in a horizontal direction ×5 modules in a vertical direction Total number of separation membrane modules M: 50 modules

[Casing]

Casing M1-(1):

Casing size: height: 2.46 m, width: 2.96 m, height: 3.54 m (rectangular parallelepiped)

Outer surface area of casing: 52.98 m$^2$

Thickness of layer constituting casing: 21 cm

Overall heat-transfer coefficient of material formed of layer constituting casing: 0.44 W/(m$^2$·K)

Integration form of separation membrane module: Integration form (1)

Type of separation membrane module M to be held: separation membrane module M1

Casing M2-(1):

Casing size: height: 3.76 m, width: 2.96 m, height: 3.54 m (rectangular parallelepiped)

Outer surface area of casing: 69.89 m$^2$ Thickness of layer constituting casing: 21 cm Overall heat-transfer coefficient of material formed of layer constituting casing: 0.44 W/(m$^2$·K)

Integration form of separation membrane module: Integration form (1)

Type of separation membrane module M to be held: separation membrane module M2

Casing M1-(2):

Casing size: height: 2.46 m, width: 5.92 m, height: 3.54 m (rectangular parallelepiped)

Outer surface area of casing: 88.52 m$^2$

Thickness of layer constituting casing: 21 cm

Overall heat-transfer coefficient of material formed of layer constituting casing: 0.44 W/(m$^2$·K)

Integration form of separation membrane module: integration form (2)

Type of separation membrane module M to be held: separation membrane module M1

Casing M2-(2):

Casing size: height: 3.76 m, width: 5.92 m, height: 3.54 m (rectangular parallelepiped)

Outer surface area of casing: 113.13 m$^2$ Thickness of layer constituting casing: 21 cm Overall heat-transfer coefficient of material formed of layer constituting casing: 0.44 W/(m$^2$·K)

Integration form of separation membrane module: integration form (2)

Type of separation membrane module M to be held: separation membrane module M2

Casing M3-(2):

Casing size: height: 6.36 m, width: 5.92 m, height: 3.54 m (rectangular parallelepiped)

Outer surface area of casing: 162.34 m$^2$

Thickness of layer constituting casing: 21 cm

Overall heat-transfer coefficient of material formed of layer constituting casing: 0.44 W/(m$^2$·K)

Integration form of separation membrane module: integration form (2)

Type of separation membrane module M to be held: separation membrane module M3

[Pipe]

Pipe 1-(1)

Integration form of separation membrane module: Integration form (1)

Source gas flow pipe: diameter: 11.40 cm, length: 0.83 m
Diameter: 6.00 cm, length: 0.67 m
Permeate gas flow pipe: diameter: 11.40 cm, length: 0.83 m
Diameter: 6.00 cm, length: 0.67 m
Retentate gas flow pipe: diameter: 11.40 cm, length: 0.83 m
Diameter: 6.00 cm, length: 0.67 m
Surface area: 1.27 m$^2$ (outer surface areas of all pipes)

Pipe 2-(1)

The pipe 2-(1) is the same as the pipe 1-(1) except that the jacket is provided to cover the outer surface of the pipe, and the outer surface of the jacket is covered with the composite material including the heat insulating material. However, the jacket is provided on the outer surface of the pipe, so that the diameter of the pipe is 1.5 times that of pipe 1-(1).

Surface area: 7.85 m$^2$ (outer surface of composite material covering jacket of outer surface of pipe)

Overall heat-transfer coefficient of composite material covering outer surface of pipe: 0.44 W/(m$^2$·K)

Thickness of composite material covering outer surface of pipe: 21 cm

Pipe 1-(2)

Integration form of separation membrane module: integration form (2)

Source gas flow pipe: diameter: 11.40 cm, length: 1.67 m
Diameter: 6.00 cm, length: 1.33 m
Permeate gas flow pipe: diameter: 11.40 cm, length: 1.67 m
Diameter: 6.00 cm, length: 1.33 m
Retentate gas flow pipe: diameter: 11.40 cm, length: 1.67 m
Diameter: 6.00 cm, length: 1.33 m
Surface area: 2.54 m$^2$ (outer surface areas of all pipes)

Pipe 2-(2)

The pipe 2-(2) is the same as the pipe 1-(2) except that the jacket is provided to cover the outer surface of the pipe, and the outer surface of the jacket is covered with the composite material including the heat insulating material. However, the jacket is provided on the outer surface of the pipe, so that the diameter of the pipe is 1.5 times that of pipe 1-(2).

Surface area: 15.69 m$^2$ (outer surface of composite material covering jacket of outer surface of pipe)

Overall heat-transfer coefficient of composite material covering outer surface of pipe: 0.44 W/(m$^2$·K)

Thickness of composite material covering outer surface of pipe: 21 cm

[Conditions]

An heat release amount when the external air temperature was 20° C. and the source gas was fed to separation membrane module M at a temperature of 110° C. was calculated based on the surface areas and overall heat-transfer coefficients of separation membrane module M and pipe, and the outer surface areas and overall heat-transfer coefficients of each casing and each pipe. The results are shown in Table 1.

In the calculation of the overall heat-transfer coefficient, the heat medium for maintaining the temperature of the gas flowing in separation membrane modules M and in the pipe was air, and separation membrane modules M were integrated without being in contact with each other and using the holding frame.

When the casing was used, the internal space of the casing was filled with air, and the heat source unit was provided in the case. Heating at the heat source unit was performed so that the heat release amount from the casing was compensated for, and the temperature of the air with which the internal space of the casing was filled was the same as the temperature of the source gas. The temperature inside the casing was wholly uniform.

When the jacket was provided to cover the outer surface of each separation membrane module M without using the casing, the air flowed in the jacket. Heated air was fed into the jacket so as to compensate for the heat release amount from the outer surface of the jacket to maintain the temperature of the source gas fed into each separation membrane module M. The temperature inside the jacket was set to be wholly uniform.

The external volume efficiency was calculated based on the following formula:

external volume efficiency=(external volume of separation membrane module/external volume of casing)×100.

The external volume of the separation membrane module was taken as the external volume of the cylindrical member.

TABLE 1

| | Type of seperation membrane module | Intergration form | Kind of casing | Pipe | External volume efficiency [%] | Heat radiation area [m$^2$] | Heat radiation amount [J/s] |
|---|---|---|---|---|---|---|---|
| Example 1 | M1 | (1) | M1-(1) | 1-(1) | 6.4 | 53.0 | 2098 |
| Comparative Example 1 | M4 | (1) | — | 2-(1) | — | 142.0 | 5622 |
| Example 2 | M2 | (1) | M2-(1) | 1-(1) | 7.6 | 69.9 | 2768 |
| Comparative Example 2 | M5 | (1) | — | 2-(1) | — | 220.1 | 8715 |
| Example 3 | M1 | (2) | M1-(2) | 1-(2) | 6.4 | 88.5 | 3506 |
| Comparative Example 3 | M4 | (2) | — | 2-(2) | — | 283.9 | 11244 |
| Example 4 | M2 | (2) | M2-(2) | 1-(2) | 7.6 | 113.1 | 4480 |
| Comparative Example 4 | M5 | (2) | — | 2-(2) | — | 440.2 | 17430 |
| Example 5 | M3 | (2) | M3-(2) | 1-(2) | 8.6 | 162.3 | 6429 |
| Comparative Example 5 | M6 | (2) | — | 2-(2) | — | 752.6 | 29803 |

From Table 1, it can be expected that, in Examples 1 to 5 (when the integrated separation membrane modules were held in the casing), the heat radiation area could be reduced as compared with that in Comparative Examples 1 to 5 (when the integrated separation membrane modules were exposed to the external air), to suppress the heat radiation amount. Therefore, it is considered that the energy required for maintaining the temperature of the gas flowing in the separation membrane module when the separation membrane modules are integrated and held in the casing as in Examples 1 to 5 can be suppressed as compared with that when the casing is not provided.

REFERENCE SIGNS LIST

1: gas separation membrane element, 2: gas separation membrane, 3: feed-side flow channel member, 4: permeate-side flow channel member, 5: central tube, 10: gas separation apparatus, 10a: gas separation apparatus, 11: casing, 12: holding frame, 13: heat source unit, 15: housing, 17: source gas flow pipe, 17a: source gas flow pipe, 18: permeate gas flow pipe, 18a: permeate gas flow pipe, 18b: permeate gas flow pipe, 19: retentate gas flow pipe, 19a: retentate gas flow pipe, 19b: retentate gas flow pipe, 20: branched part, 20a: branched part, 21: collecting part, 21a: collecting part, 21b: collecting part, 30: hole, 31: feed-side end part, 32: discharge port, 33: discharge-side end part, M: separation membrane module, Ma: separation membrane module

The invention claimed is:

1. A gas separation apparatus comprising:
    a separation membrane module including at least one gas separation membrane element in a housing;
    a casing for blocking external air; and
    a heat source unit for adjusting a temperature of a fluid with which the casing is filled,
    wherein the casing holds greater than or equal to two separation membrane modules, and
    wherein the gas separation membrane element includes a gas separation membrane including a hydrophilic resin composition layer, and the hydrophilic resin composition layer contains a hydrophilic resin having a structural unit derived from an alkyl acrylate, an alkyl methacrylate, a vinyl ester of a fatty acid, or a derivative thereof.

2. The gas separation apparatus according to claim 1, wherein the heat source unit is provided at least inside or outside the casing.

3. The gas separation apparatus according to claim 1, wherein layers constituting the casing have a thermal resistance value of greater than or equal to 0.1 m$^2$·K/W.

4. The gas separation apparatus according to claim 3, wherein a material forming at least one layer of the layers constituting the casing has a thermal conductivity of 1 W/(m·K) or less.

5. The gas separation apparatus according to claim 1, wherein the separation membrane module includes greater than or equal to two gas separation membrane elements in a housing.

6. The gas separation apparatus according to claim 1, further comprising:
    a source gas flow pipe for feeding a source gas to the separation membrane module; and
    an exhaust gas flow pipe for discharging an exhaust gas from the separation membrane module.

7. The gas separation apparatus according to claim 6, wherein:
- the source gas flow pipe includes a branched part for distributing and feeding the source gas to each of the separation membrane modules;
- the exhaust gas flow pipe includes a collecting part for collecting and discharging the exhaust gases discharged by the separation membrane modules; and
- at least one of the branched part and the collecting part is provided in the casing.

8. The gas separation apparatus according to claim 6, wherein the source gas fed to the gas separation membrane element contains at least steam.

9. The gas separation apparatus according to claim 1, wherein the hydrophilic resin composition layer contains the hydrophilic resin and a substance that reversibly reacts with an acidic gas.

10. The gas separation apparatus according to claim 1, wherein the gas separation membrane element is a spiral gas separation membrane element.

11. A gas separation method using the gas separation apparatus according to claim 1, the method comprising the steps of:
- adjusting a temperature of the fluid so that the temperature is maintained at a temperature using the heat source unit; and
- feeding a source gas to the separation membrane module to perform a gas separation treatment.

* * * * *